United States Patent [19]
Ekedal

[11] 3,781,030
[45] Dec. 25, 1973

[54] POWER DRAWN COLLAPSIBLE TRAILER

[76] Inventor: Palmer J. Ekedal, 18721 LaGuardia St., Rowland Heights, Calif. 91745

[22] Filed: Aug. 30, 1972

[21] Appl. No.: 285,080

[52] U.S. Cl............... 280/36 C, 280/42, 296/27
[51] Int. Cl................................. B60p 3/06
[58] Field of Search............ 280/36 R, 36 C, 42; 296/27

[56] References Cited
UNITED STATES PATENTS
3,572,743   3/1971   Parr................................. 280/42
2,037,291   4/1936   Waldmann......................... 280/42

Primary Examiner—Philip Goodman
Assistant Examiner—John A. Carroll
Attorney—William C. Babcock

[57] ABSTRACT

A trailer that includes a rectangular, load supporting frame that is defined by forward and rearward end pieces pivotally connected to first and second L-shaped side pieces. Two stub shafts that are longitudinally spaced from one another project from the center portions of the side pieces, and rotatably support two pneumatic tired wheels.

4 Claims, 9 Drawing Figures

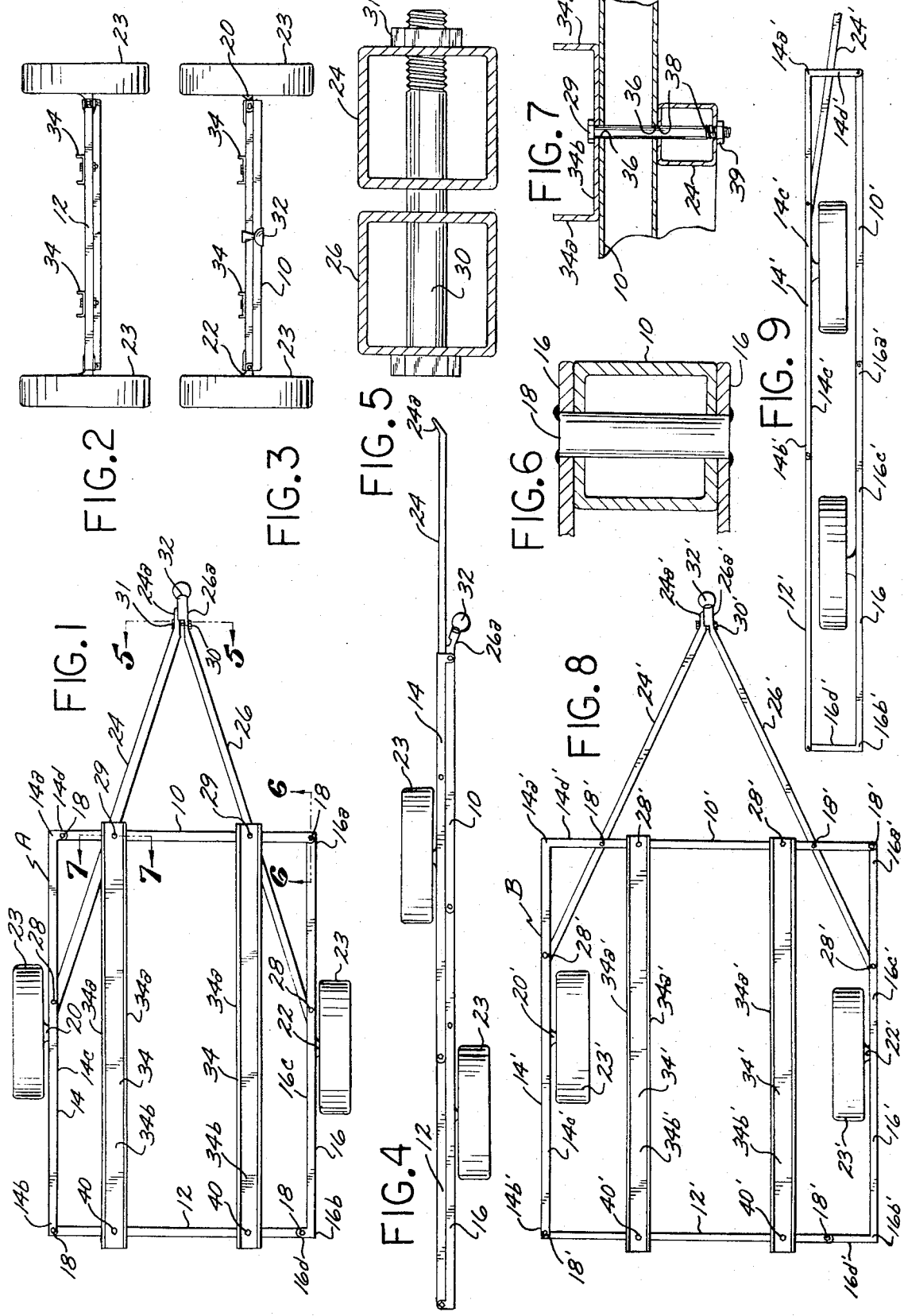

3,781,030

POWER DRAWN COLLAPSIBLE TRAILER

First and second forwardly and inwardly extending draw bars are pivotally connected to the side pieces, and are rigidly connected to the forward end piece by bolts or the like. The draw bars support a trailer hitch at the forward extremities, where the draw bars are in abutting contact. Elongate, upturned, channel-shaped members capable of supporting motorcycles may be removably secured to the end pieces by bolts or the like. When the channel-shaped members are disengaged from the end pieces, and the draw bars from the forward end piece, the trailer may be collapsed into a narrow, elongate, generally rectangular configuration to occupy a minimum of space when stored. Due to the longitudinal offsetting of the stub shafts and wheels, the device when drawn over a transverse bump in the road moves over the bump with a rolling motion, rather than a violent up-and-down motion as occurs when the shafts and wheels are transversely aligned.

BACKGROUND OF THE INVENTION

1. Field of the Invention

A power drawn, collapsible trailer.

2. Description of the Prior Art

The popularity of motorcycle riding has increased tremendously in recent years, particularly in desert areas, but one of the problems arising therefrom has been providing easy and convenient means for transporting the motorcycles from a city area to the desert area where they will be ridden. Various trailers have been used for this purpose, but the trailers are heavy, bulky and cumbersome, and pose a substantial storage problem when not in use.

The primary purpose in devising the present invention is to supply a lightweight, power-drawn trailer that may be collapsed when not in use to occupy a minimum of space, with the trailer capable of having one or more upturned, channel-shaped members rigidly supported on the frame that forms a part thereof, and the channel-shaped members serving as a support for the motorcycles that are lashed to the trailer by conventional means. After the trailer has been used for transporting motorcycles or other loads, the channel-shaped members may be removed therefrom and the frame collapsed to an elongate, extremely narrow, rectangular shape, where the device will occupy a minimum of space when not in use.

SUMMARY OF THE INVENTION

A trailer that includes a rectangular, load-supporting frame that is defined by forward and rearward end pieces, which end pieces are pivotally connected to first and second L-shaped side pieces. Two stub shafts are provided that are longitudinally offset from one another and project from the center portions of the side pieces, with the shafts rotatably supporting two pneumatic tired wheels.

First and second forwardly and inwardly extending draw bars are pivotally connected to the side pieces, and by bolts or other fastening means rigidly but removably secured to the forward end piece. The draw bars support a trailer hitch at their forward extremities, when the draw bars are in abutting contact.

Elongate, upturned, channel-shaped members capable of supporting motorcycles may be removably secured to the end pieces to extend longitudinally relative to the frame. The motorcycles have the wheels thereof supported in the channel-shaped members and the balance of the motorcycles are lashed or otherwise removably secured to the trailer by conventional means. When the channel-shaped members are disengaged from the end pieces, and the draw bars from the forward end piece, the trailer may be collapsed into an elongate, narrow, generally rectangular configuration to occupy a minimum of space when stored.

BRIEF DESCRIPTION OF THE DRAWINGS

FIG. 1 is a top plan view of a first form of the trailer in an expanded, load-supporting position;

FIG. 2 is a rear elevational view of the trailer shown in FIG. 1;

FIG. 3 is a front elevational view of the trailer shown in FIG. 1;

FIG. 4 is a top plan view of the tailer shown in FIG. 1 when in the collapsed position;

FIG. 5 is a fragmentary, transverse, cross-sectional view of the device taken on the line 5—5 of FIG. 1;

FIG. 6 is a fragmentary, vertical, cross-sectional view of the first form of the trailer shown in FIG. 1, taken on the line 6—6 thereof;

FIG. 7 is a fragmentary, vertical, cross-sectional view of the first form of the trailer shown in FIG. 1 taken on the line 7—7 thereof;

FIG. 8 is a top plan view of a second form of the collapsible trailer; and

FIG. 9 is a top plan view of a second form of trailer shown in FIG. 8 when the latter is in the collapsed position for storage purposes.

DESCRIPTION OF THE PREFERRED EMBODIMENTS

The first form A of the trailer, as may best be seen in FIGS. 1 through 7, includes a forward end piece 10, rearward end piece 12, and first and second side pieces 14 and 16. The side piece 14 has a first end 14a and second end 14b; likewise, the second side piece 16 has a first end 16a and a second end 16b. The side pieces 14 and 16, as may best be seen in FIG. 1, include first elongate legs 14c and 16c and second legs 14d and 16d. The second leg 14d is normally disposed to the first leg 14c and projects inwardly from the first end 14a of side piece 14. The second leg 16d is normally disposed to the first leg 16c and projects inwardly from the second end 16b of side piece 16. The end pieces 10 and 12 and side pieces 14 and 16 are preferably formed from rigid tubular members of substantially square transverse cross section.

The transverse cross section of the end pieces 10 and 12 is somewhat smaller than that of the side pieces 14 and 16, and as a result the side pieces have portions that overlap the ends of the end pieces 10 and 12. A number of rivets or pins 18 are provided that extend through aligned openings in the cross pieces 10 and 12 and side pieces 14 and 16 to pivotally connect the end pieces and side pieces together to define the rectangular frame shown in FIG. 1. In the first form of the trailer A, as shown in FIG. 1, first and second stub shafts 20 and 22 project outwardly from substantially the center of first legs 14c and 16c, with the shafts rotatably supporting two pneumatic tired wheels 23, but with the shafts longitudinally offset from one another.

First and second forwardly and inwardly extending draw bars 24 and 26 are provided that have their rearward ends pivotally connected by pins or rivets 28 to the underside of the first and second side pieces 14 and 16. The draw bars 24 and 26 have vertically extending bores (not shown) formed therein that are alignable with bores (not shown) in the first end piece 10 through which bolts 29 may be extended for purposes that will be explained later. The forward ends of the draw bars 24 and 26 develop into parallel sections 24a and 26a that may be placed in abutting relationship with one another, and the sections have transversely aligned bores therein through which a bolt 30 may be extended to secure the sections 24a and 26a in the abutting contact relationship shown in FIG. 1. The section 26a supports a trailer hitch 32 of conventional design on the forward end portion thereof, which hitch may be in the form of a socket that removably engages a ball (not shown) supported on the rearward end of a truck or automotive vehicle.

The draw bars 24 and 26, as may best be seen in FIG. 5, are formed of tubular rigid material, preferably of a square transverse cross section. If desired, the tubular section may be formed by welding two angle irons together along abutting edges.

In FIG. 1 it will be seen that two upturned, elongate, horizontal, channel-shaped members 34 are provided, which are of sufficient width to have the wheels of motorcycles rest between the flanges 34a thereof. The webs 34b of the channel-shaped members 34 rest on the upper surfaces of the end pieces 10 and 12. The webs 34b on their forward ends have bores formed therein through which the bolts 29 may be extended to engage vertically aligned bores 36 formed in the forward end piece 10, as well as bores 38 provided in the draw bars 24 and 26, as may be seen in FIG. 7. Each of the bolts 29 is provided with a nut 39 to removably hold it in engagement with one of the channel-shaped members 34, draw bar members 24 or 26, and the forward end piece 10.

It will be particularly noted in FIG. 1 that the stub shafts 20 and 22 are longitudinally spaced from one another and as a result when the first form A of the trailer is drawn over a transverse bump in the road, the wheels 23 travel over the bump with a rolling motion imparted to the trailer, rather than an abrupt upward and downward movement when the first and second stub shafts are transversely aligned with one another.

The rearward ends of the channel-shaped members 34 are removably secured to rear end piece 12 by bolts 40 that extend downwardly through aligned openings formed therein. It will be noted in FIG. 5 that a bolt 30 is provided with a nut 31 to removably hold the draw bars 24 and 26 together as shown in FIG. 1.

After the first form of the trailer A, as shown in FIG. 1, has been used and it is desired to store the latter, the bolts 29 are removed from the device, as is the bolt 30, with the end pieces and side pieces then being pivoted to the collapsed position shown in FIG. 4, where the device occupies a minimum of space.

Prior to the collapsing of the frame as above-described, the channel-shaped members 34 must, of course, be taken therefrom by removing the bolts 40. When it is desired to use the first form A of the trailer for cargo-hauling purposes, the above-described operation is simply reversed.

A second form B of the trailer, as is shown in FIGS. 8 and 9, which is similar in construction to the first form other than that the stub shafts 20 and 22 project inwardly to support the pneumatic tire wheels 23. Elements in the first form A of the invention are identified in FIGS. 8 and 9 by the same numerals previously used but with a prime added thereto. It will be particularly noted that in the second form B of the invention the second legs 14d' and 16d' are substantially greater in length than the legs 14d and 16d shown in the first form A.

The second form B of the trailer may be collapsed in the same manner as the first form, but, as may best be seen in FIG. 9, when the trailer is so collapsed the wheels 23' are situated within the confines of the frame structure. The second form B of the trailer is shown in plan view in the collapsed condition in FIG. 9.

The use and operation of the invention has been explained previously in detail and need not be repeated.

I claim:

1. A collapsible power-drawn trailer that includes:
   a. a rectangular frame assembly that includes:
      1. forward and rearward end pieces;
      2. first and second elongate, laterally spaced side pieces, said first and second side pieces each including first parallel, laterally spaced first legs having first and second ends and second legs that are normally disposed to said first legs and extend from said first end of said first side piece and second end of said second sidepiece; and
      3. a plurality of first pins that pivotally connect said forward end piece to said first end of said first leg of said first side piece, and said second leg that extends from said first end of said second leg of said second side piece, and said rearward end piece to said second end of said second leg of said second side piece and said second leg that projects from said second end of said first side piece, with said forward end piece and the forward portions of said first legs having a plurality of spaced first openings therein;
      4. first and second stub shafts that are longitudinally spaced from one another and are secured to said first legs of said first and second end pieces; and
      5. first and second pneumatic tired wheels rotatably mounted on said first and second shafts;
   b. first and second drawbars having a plurality of spaced second openings therein that are vertically alignable with said first openings when said drawbars extend forwardly and inwardly towards one another from said frame assembly to define an apex at the forward ends of said drawbars;
   c. a plurality of first bolts and nuts, which bolts removably engage said aligned first and second openings to secure said drawbars to said frame;
   d. a trailer hitch secured to the forward ends of said drawbars to permit said trailer to be drawn by a power vehicle; and
   e. first means removably securable to said frame for supporting a load on said frame when said frame is in a first position where said forward and rearward end pieces are normally disposed to said first legs of said side pieces, but said frame capable of being pivoted to a second position when said drawbars, first bolts and nuts and said first means are removed therefrom, said frame when in said second position having a width slightly greater than said second legs to permit said trailer to be stored in a minimum of space when not in use, and said trailer due to the longitudinal spacing of said stub shafts moving over a transverse bump in a road surface with a rolling motion rather than an abrupt up and down motion as occurs when said stub shafts are transversely aligned.

2. A trailer as defined in claim 1 in which said stub shafts project outwardly from said first legs of said side pieces.

3. A trailer as defined in claim 1 in which said stub shafts project inwardly from said first legs of said side pieced, with said wheels having the center portions thereof situated within the confines of said frame when said frame is in said second position.

4. A trailer as defined in claim 1 in which said first means is at least one upturned channel member that rests on the upper surfaces of said end pieces and is capable of supporting a motorcycle thereon, and in addition which includes:

f. bolt means for removably securing said channel to said end pieces.

* * * * *